US009026541B2

(12) United States Patent
Mahmud et al.

(10) Patent No.: US 9,026,541 B2
(45) Date of Patent: May 5, 2015

(54) OPTIMIZING USER SELECTION FOR PERFORMING TASKS IN SOCIAL NETWORKS

(71) Applicant: International Business Machines Corporation, Armonk, NY (US)

(72) Inventors: Jalal U. Mahmud, San Jose, CA (US); Nimrod Megiddo, Palo Alto, CA (US); Jeffrey W. Nichols, San Jose, CA (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/774,273

(22) Filed: Feb. 22, 2013

(65) Prior Publication Data

US 2014/0244658 A1    Aug. 28, 2014

(51) Int. Cl.
*G06F 17/30*    (2006.01)
(52) U.S. Cl.
CPC .............................. *G06F 17/30283* (2013.01)
(58) Field of Classification Search
CPC ....................................................... G06F 17/30
USPC ................................................ 707/600–899
See application file for complete search history.

(56) References Cited

U.S. PATENT DOCUMENTS

| 8,276,207 B2 | 9/2012 | Walsh et al. |
| 2011/0119335 A1 | 5/2011 | Galbreath et al. |
| 2013/0226912 A1* | 8/2013 | Agapiev ........................ 707/723 |

FOREIGN PATENT DOCUMENTS

WO    2012035149 A1    3/2012

OTHER PUBLICATIONS

Anonymous, "Method and Apparatus for User Authentication Based on Dynamic Question-Answer Generation from Social Networks Data", Mar. 19, 2012, pp. 1-3, IP.com, USA.
Banerjee, D. et al., "Method and System for Optimizing Storage of Messages in Social Networking Environments", Defensive Publication, Dec. 22, 2011, pp. 1-3, Yahoo!, USA.
Anonymous, "Optimizing the Selection of Strangers to Answer Questions in Social Media", Proceedings of the 2012 Conference on Information and Knowledge Management (CIKM '12), Oct./Nov. 2012, pp. 1-10, ACM, USA.

* cited by examiner

*Primary Examiner* — Isaac M Woo
(74) *Attorney, Agent, or Firm* — Sherman IP LLP; Kenneth L. Sherman; Steven Laut (57) ABSTRACT

Embodiments of the invention relate to optimizing user response rate in social media. One embodiment includes generating a statistical model for modeling a likelihood of social media user response from data collected from social media using a set of available features. The social media users are ranked in an estimation set based on the statistical model. The ranked social media users are placed in a rank ordered list. A sub-interval on the rank ordered list is selected for maximizing the response rate.

20 Claims, 11 Drawing Sheets

| Minimum Interval Size (K) | Optimal Interval | | Training Response-Rate-Optimal | Test Response Rate-Optimal |
|---|---|---|---|---|
| | Size | [Start, End] | | |
| 0% | 0.5% | [98%, 98.5%] | 1 | 1 |
| 5% | 6% | [91%, 97%] | 0.88 | 0.69 |
| 10% | 11% | [75%, 86%] | 0.82 | 0.67 |
| 20% | 20% | [72%, 92%] | 0.77 | 0.63 |
| 30% | 33% | [61%, 94%] | 0.69 | 0.61 |
| 50% | 51% | [45%, 96%] | 0.60 | 0.55 |
| 70% | 71% | [22%, 93%] | 0.49 | 0.47 |
| 90% | 91% | [9%, 100%] | 0.39 | 0.37 |

| Feature Set | Response Rate | | |
|---|---|---|---|
| | TSA-Tracker-1 | TSA-Tracker-2 | Product |
| All | 0.71 | 0.55 | 0.69 |
| Personality | 0.65 | 0.52 | 0.63 |
| Responsiveness | 0.64 | 0.45 | 0.47 |
| Readiness | 0.66 | 0.5 | 0.65 |
| Significant | 0.77 | 0.65 | 0.75 |
| Top-10 Significant | 0.76 | 0.64 | 0.69 |
| Top-10 Significant and their Products | 0.77 | 0.65 | 0.74 |
| Consistent | 0.73 | 0.58 | 0.66 |
| Top-4 Features and their Products | 0.75 | 0.64 | 0.78 |

| Data Set | Size of Optimal Interval | Response Rate at Optimal Interval | Expected Net Benefit (Algorithm) | Expected Net Benefit (without Algorithm) |
|---|---|---|---|---|
| TSA-Tracker-1 | 66% | 54% | 390 | 377.6 |
| TSA-Tracker-2 | 47% | 35% | 236 | 184 |
| Product | 54% | 58% | 724 | 646.8 |

FIG. 10

| Benefit-to-Cost Ratio | Expected Net Benefit (TSA-Tracker-1) | | Expected Net Benefit (Product) | |
|---|---|---|---|---|
| | Using our Algorithm | Without Algorithm | Using our Algorithm | Without Algorithm |
| 1 | -14.25 | -68.44 | -49 | -212.52 |
| 2 | 19.5 | -18.88 | 32 | -177.04 |
| 5 | 164.8 | 129.8 | 290 | 169.4 |
| 10 | 390 | 377.6 | 724 | 646.8 |
| 100 | 4891 | 4838 | 9291 | 9240 |
| 1000 | 49510 | 49442 | 95734 | 95172 |

OPTIMIZING USER SELECTION FOR PERFORMING TASKS IN SOCIAL NETWORKS

This invention was made with Government support under W911NF-12-C-0028 awarded by Army Research Office. The Government has certain rights in the invention.

BACKGROUND

Embodiments of the invention relate to user selection for task performance and, in particular, optimizing user selection for task performance in social media.

Social media are popular avenues for information sharing or exchange. Information sharing systems, such as forums for obtaining product reviews or social question-answering systems are sometimes helpful to users on social media platforms. People also informally exchange information in the form of questions and answers in social media, such as Facebook® and Twitter®.

One use of information exchanged in social media platforms is to perform tasks, such as translating a sentence from one language to another language, problem solving while developing software, administrative processing, shopping using a particular website, obtaining a deal for a travel website, responding to questions, etc. Finding the right people on social media to obtain the desired information (often for task completion) is difficult for several reasons. Maybe none of the friends in one's own social networks are able to perform a task, e.g., they may not know the answers to a specific question, they may not have gone through a certain process so they do not know the details, or they do not know the language in question. Additionally, there are a multitude of strangers on social media, and not many of the strangers may be able to perform the task, e.g., answering a question.

BRIEF SUMMARY

Embodiments of the invention relate to optimizing user response rate in social media. One embodiment includes generating a statistical model for modeling a likelihood of social media user response from data collected from social media using a set of available features. The social media users are ranked in an estimation set based on the statistical model. The ranked social media users are placed in a rank ordered list. A sub-interval on the rank ordered list is selected for maximizing the response rate.

Another embodiment comprises a method including generating a statistical model for modeling a likelihood of social media user response from data collected from social media using a set of available features. The social media users are ranked in an estimation set based on the statistical model. The ranked social media users are placed in a rank ordered list. A sub-interval on the rank ordered list is selected for maximizing an expected net benefit for user selection of one or more targeted requests for responses.

Another embodiment comprises a computer program product for optimizing user selection for response to requests. The computer program product comprising a computer readable storage medium having program code embodied therewith. The program code readable/executable by a processor to perform a method comprising generating a statistical model, by the processor, for modeling a likelihood of social media user response from data collected from social media using a set of available features. The social media users in an estimation set are ranked, by the processor, based on the statistical model. The ranked social media users are placed, by the processor, in a rank ordered list. A sub-interval on the ranked list is selected based on preselected response related criteria.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
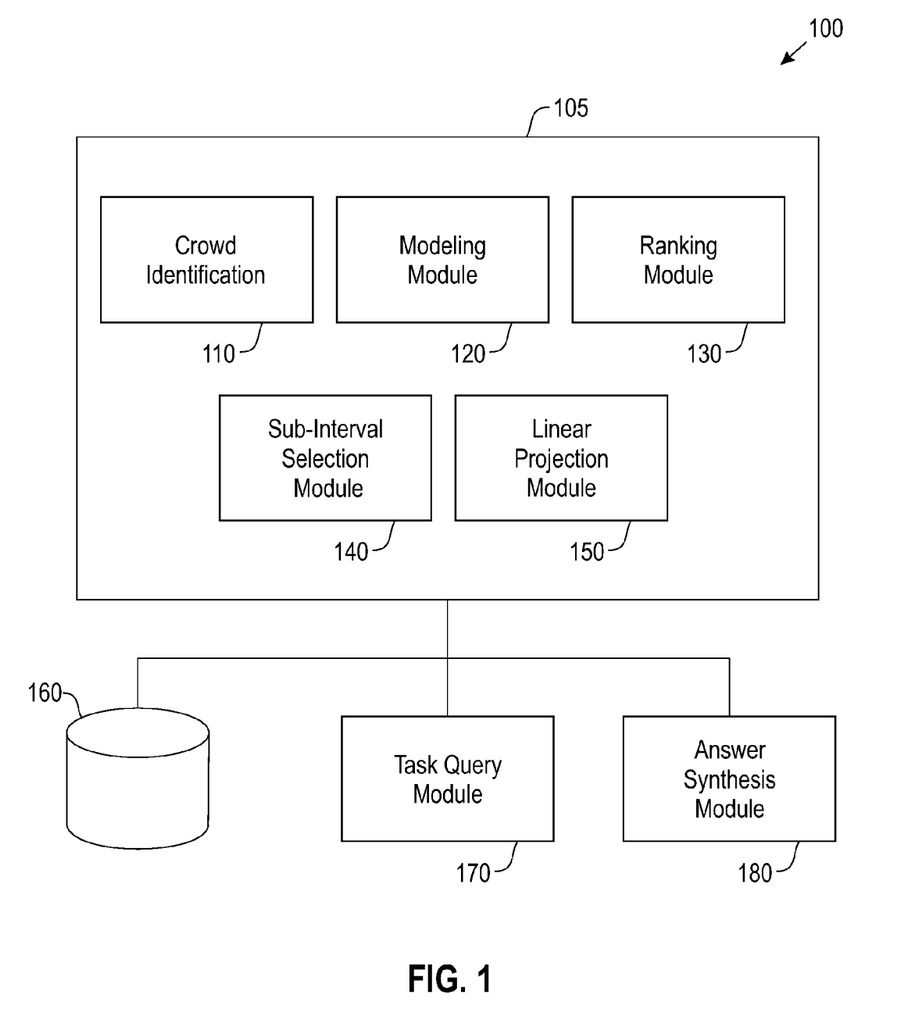
FIG. 1 illustrates a block diagram of an example system for optimizing user selection for task performance in social media, in accordance with an embodiment of the invention.

Referring now to the drawings, FIG. 1 shows an implementation of system 100 for optimizing user selection for task performance. In one embodiment, system 100 comprises a user selection optimization module 105, a database 160, a task query module 170, and an answer synthesis module 180. In one embodiment, the user selection optimization module 105 may include a crowd identification module 110, a modeling module 120, a ranking module 130, a sub-interval selection module 140 and a linear projection module 150. In one embodiment, the system 100 provides users of open social media platforms a way of optimizing users (e.g., strangers in social media) that may meet criteria for performing a desired task (e.g., answering a question, providing information, etc.).

Figure 2:
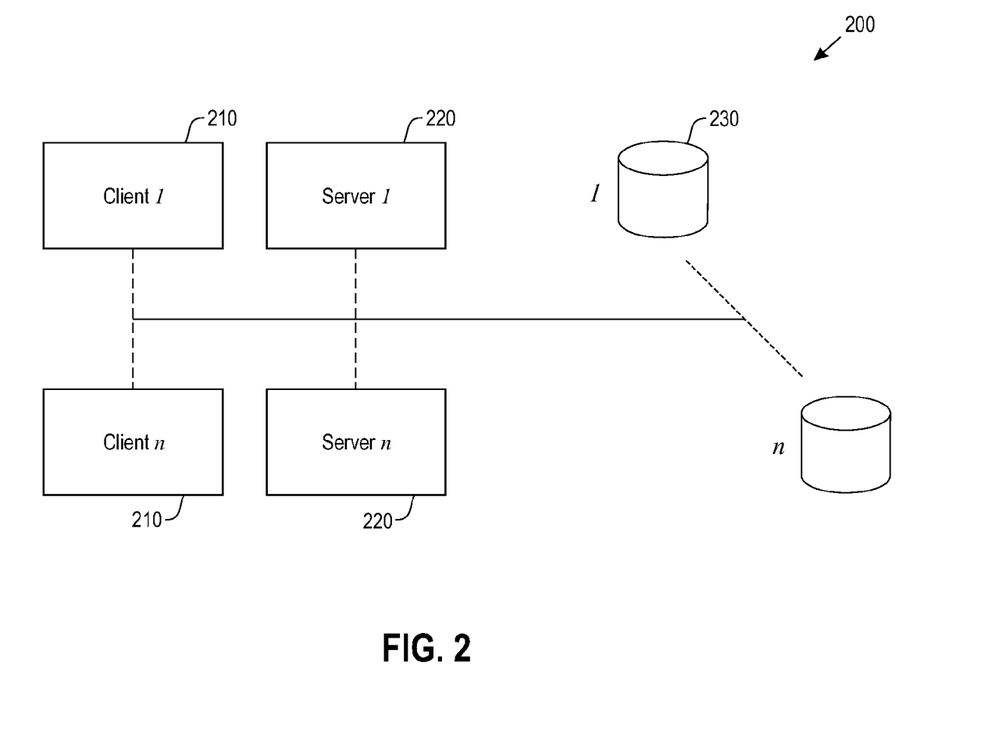
FIG. 2 illustrates a block diagram of an example client/server system utilizing optimization of user selection for task performance in social media, in accordance with an embodiment of the invention.

FIG. 2 illustrates a block diagram for a system 200, such as a network platform that employs system 100 for optimizing user selection for task performance. In one embodiment, the system 200 includes multiple client devices 210 1-n, multiple server devices 220 1-n, and multiple storage devices 230 1-n, where n is a positive number greater than 1. In one example, the system 100 may be used only on client devices 210, only on server devices 220, or on both client devices 210 and server devices 220. In one example, the server devices 220 run the network platform and users use the client devices 210 to access the network.

In one embodiment, the task query module 170 provides social media users that have been determined to be, for example, willing, able, ready, and optionally trustworthy and emotionally fit with a particular user's desired task (e.g., request for an answer to a question, request for information, etc.). In one example, the task query module 170 keeps track of users that are filtered based on being willing, able, ready, trustworthy and emotionally fit for particular desired tasks. In one example, scores may be associated with particular users based on learned responses and determined traits, such as being willing, able, ready, trustworthy, and emotionally fit for particular topics.

In one embodiment, the answer synthesis module 180 provides tracking to evaluate responses to requested tasks. In one example, a user may be prompted to rate another user's response to a task. In another example, all users may be tracked to determine the likelihood of responding to similar requested tasks where a weighting may be applied to the users based on different topics or types of requests. In one embodiment, the answer synthesis module 180 may provide the user weighting based on defined topics and types of task requests for storage in the database 160. In another example, the answer synthesis module 180 provides response filtering based on searching response content for keywords that are predefined for use in excluding answers that are not appropriate (e.g., non-appropriate language, sarcastic language, etc.).

In one embodiment, the crowd identification module 110 provides a way of estimating any given user's ability to perform a task, for example, using rules, heuristics, and statistical machine-learning-based models. In one example, rule-based ability estimation for a task (e.g., a user question) may require that a potential responder know information about a topic of the question (e.g., a product-review question), be present in a particular location (e.g. for a question regarding wait time at an airport), etc. Users' past social network behavior may also be used to determine whether users are ready to perform a task based on, for example, usage patterns for previous social network content updates (e.g., status updates, comments, chats, etc.). Personality features, which may be computed based on psycho-linguistic analysis of users social media content may be used for filtering users. In one embodiment, the psycho-linguistic analysis may be provided using the LIWC (Linguistic Inquiry and Word Count) dictionary and identifying LIWC-based features from social media content. In another embodiment, the analysis is carried out using Big-Five personality traits and identifying features based on Big-Five personality traits.

In one embodiment, users may be further classified or filtered for performing a task based on whether users are trustworthy to provide a response for the task. That is, it is desirable to recruit users that can be trusted to provide truthful responses to the best of their knowledge. In one example, a user's trustworthiness may be based on personality traits, such as one's cautiousness, morality, and dutifulness, as well as one's past social behavior, including how truthful his/her previous responses to others have been based on a number of factors, such as fact-based content, other users' voting on the posts, etc.

In one embodiment, a collection of users filtered based on being able, ready, willing, and trustworthy to perform a task may also be filtered based on whether they are also emotionally fit to provide a response for the task. That is, it is desirable to recruit users that are emotionally suitable to be engaged on social media and less likely to cause potential side effects, such as starting a feud on social media. Once the users are filtered, these users are stored in the database 160.

In one embodiment, the modeling module 120 provides for partitioning each data set (i.e., identified users stored in the database 160) randomly into K parts for K-fold cross validation. For each user/person in the training set, features are computed (e.g., features for modeling a user's readiness and willingness to respond to questions based on personality traits, emotional traits, heuristics, etc.). The features and response information are used to train a statistical model by the modeling module 120. Given a person in the test set and his/her computed features, the trained model outputs a probabilistic score that estimates the likelihood for the person to respond. These probabilistic estimates are not be used directly but rather calibrated by observing actual response rates in the training sets for estimating response rates in the subsets of the test sets.

In one example, let $x_i$ be the feature vector of an ith person in a data set, and $y_i$ be the response label, such that if the ith person responded, $y_i=1$; otherwise $y_i=0$. In a simplified model example, we assume that there is a unit benefit B of receiving an answer and a unit cost C of sending a question. It is noted that in other examples, the benefit of receiving additional answers to the same question may diminish as the number of answers grows.

To build an accurate prediction model, prediction errors should be minimized. Depending on the application, one type of error may be more costly than another. For example, in one application, the cost of sending a question may be much smaller than the benefit of receiving an answer. In this case, false negatives (e.g., missed people who would have responded) are more costly than false positives (e.g., selected people who do not respond). However, most of the classifiers typically do not differentiate the two kinds of misclassification errors: false positive and false negative. In one embodiment, by default, the classifier-building process assumes that the designer desires to minimize the overall misclassification rate. Similarly, a standard regression model does not distinguish between overestimating and underestimating probabilities, which in turn results in different types of misclassification errors.

In one embodiment, given the above considerations, the difference in cost is handled by properly weighing the examples, if the unit cost and unit benefit assumption is adequate. In one example, the training examples are weighted as follows. Positive examples (i.e., people who responded) are weighted by B–C, whereas negative examples (i.e., those who did not respond) are weighted by C. In other words, a false negative error, which is a misclassification of a positive example, incurs a missed-opportunity cost of B–C, where a false positive, which is a misclassification of a negative example, incurs a cost of a question C. In one example, the weights modify the distribution of the examples, so that examples with larger weight are counted more than the ones with smaller weights.

In one example, Support Vector Machines (SVM) and Logistic Regression approaches may be implemented by the modeling module 120 to predict the probability/score for a person to respond. In one implementation, for each person in a data set, exemplar statistical models yield a score $s(x)$ for the person's feature vector x as a linear function $s(x)=w^T x$ or a quadratic function, $s(x)=x^T Q x + w^T x$, where $w^T$ is the weight vector and Q has a zero diagonal. The score function defines a weak linear order on the set of feature vectors, so a training or test set can be sorted by the scores. In one example, the computed scores are used to achieve optimization. For example, suppose that a political survey is conducted where it is desired to send out exactly 1000 questions to people on social media and to receive as many responses as possible within a single day. In this hypothetical scenario, the objective is simply to maximize the response rate, although this objective is an oversimplification of real world situations as it ignores other practical constraints, such as quality of answers.

In one embodiment, the ranking module 130 ranks people in the training set by a non-decreasing order of the computed scores: $\{s1, \ldots, sn\}$. Next intervals are focused on by the sub-interval selection module 140 in this linear order rather than looking at all possible subsets of candidates. The justification for this restriction is that the linear orders generated by the models exhibit good correlation with response rates.

Figure 3:
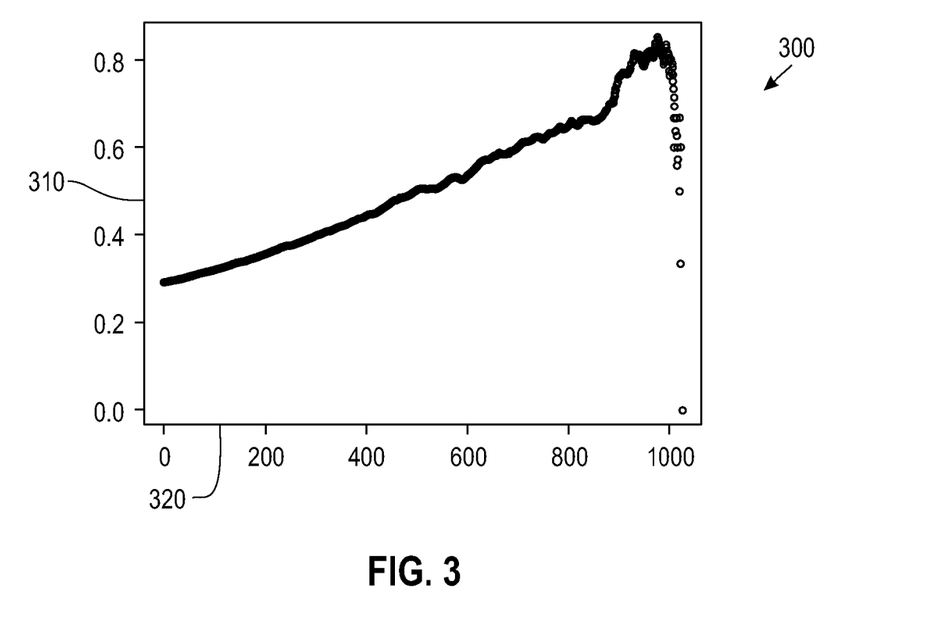
FIG. 3 illustrates a diagram of an example response rate in a training set, in accordance with an embodiment of the invention.

FIG. 3 illustrates a diagram 300 of an example response rate in a training set. The horizontal axis 320 shows the rank of an individual by the score function (rank 1000 means the individual score is better than 999 individuals) in one example, and the vertical axis 310 shows the training-set response rate in the subset of all individuals with a higher rank.

Figure 4:
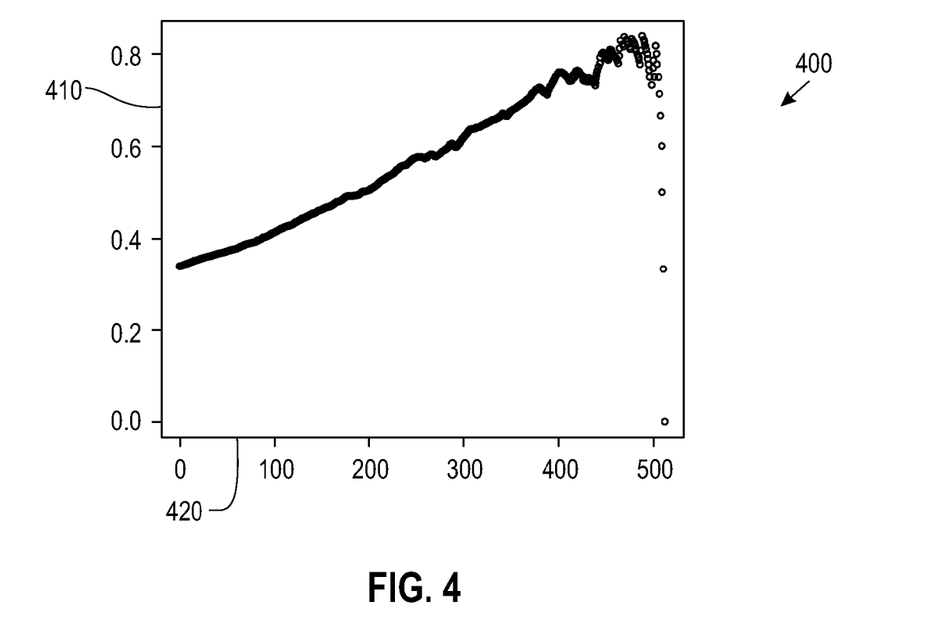
FIG. 4 illustrates a diagram of an example response rate in a test set, in accordance with an embodiment of the invention.

FIG. 4 shows the same curve when the model generated from a training set by the modeling module 120 is applied to a test set. The horizontal axis 420 shows the rank of an individual by the score function (rank 1000 means the individual score is better than 999 individuals) in one example, and the vertical axis 410 shows the test-set response rate in the subset of all individuals with a higher rank. It is apparent from diagram 400 that the score function is very predictive of response rates.

In one embodiment, user selection optimization module 105 maximizes response rate using the sub-interval selection module 140 for selecting an interval $[i, j]$ ($1 \leq i < j \leq n$) from the training set, where the corresponding interval subset $\{s_i, \ldots, s_j\}$ has a maximal response rate among all interval subsets, except short intervals at the top of the ranking may be ignored.

In one example, the reason for this restriction is that the variance in the empirical response rate in small sets is large. Therefore, a short interval that appears to be of a high response rate in the training set does not imply that the corresponding interval in the test also has a high response rate. For example, it is quite probable that the top four in a training set responded, but we do not expect the response rate of the top four in a test set of the same size to be 100% response rate, whereas there would be much higher confidence in an observed response rate of 80% in an interval of, say, 100 individuals. In another example, a restricted choice of intervals may be used, for example only those that extend to the top, i.e., of the form $[i, n]$. In some examples, linear restrictions are used rather than quadratic, such as restricting to intervals of $[i, n]$ rather than $[i, j]$ that produce suboptimal results.

In one example, the best sub-interval $[i_r, j_r]$ in the training defines a corresponding sub-interval $[i_s, j_s]$ in the test set, based on percentiles. That is, if m is the cardinality of the test set, then $i_s=[(i_r \cdot m)/n]$ and $j_s=[(j_r \cdot m)/n]$. In another example, the sub-interval selection module 140 selects from the test set an interval based on the scores, rather than the ranks, of the endpoints of the optimal interval from the training set, namely, $s(xi_r)$ and $s(xj_r)$.

In one embodiment, the sub-interval selection module 140 incorporates additional constraints for optimal interval selection. In one example, the exact size of the interval may be specified, minimum, or maximum size of the interval may also be chosen as constraints. For example, if a minimum size of the interval is specified, one example ignores intervals that are smaller than the specified minimum.

In one embodiment, the sub-interval selection module 140 maximizes expected net benefit. In one example, the benefit of receiving answers is compared with the cost of asking questions. In one example, the sub-interval selection module 140 finds an optimal interval from the training set that maximizes the expected net benefit. In one implementation, let C(k) be the cost of asking k people and B(l) be the benefit of receiving/answers. The net benefit of receiving/answers by asking k people is B(l)–C(k). Let P(k, l) be the probability of receiving l answers in response to asking k people, whose likelihood to respond is within a certain interval. The expected net benefit is then $\Sigma_l P(k, l) B(l) - C(k)$. The probability P(k, l) may be estimated by a binomial distribution. Suppose that it is determined to send questions to k individuals whose likelihood to respond is in a certain interval, where the response rate is estimated to be p. Then, $P(k, l) = \text{choose}(k, l) p^l (1-p)^{k-l}$. The probabilities P(k,l) may be computed by the recursive formula: $P(k, l) = P(k-1, l-1) \cdot p + P(k,l-1) \cdot (1-p)$. Given the estimated response rates in various score intervals in the training set, the sub-interval selection module 140 selects an interval in the test set, corresponding to the optimal interval that is found in the training set. In one embodiment, the linear projection module 150 computes the best sub-interval in the test set from the best sub-interval in the training set using simple linear projection.

In one embodiment, the user selection optimization module 105 may support any kind of cost and benefit functions, whether linear or non-linear. In one example, a tentative subset of people to ask is determined first by estimating their scores. Next, the refinement of the subset-selection optimization is iterated. As a result, the expected net benefit may be calculated, recursively, for any interval of individuals in the order of their scores to find an optimal interval for any kind of benefit and cost functions. In another example, additional constraints may be implemented during the selection process, such as bounded by the estimated probability of receiving a certain number of answers. More precisely, when a search for an optimal interval and a number k is made, those combinations of an interval and number of questions may be ignored for which the constraints are not satisfied.

Two exemplary sets of examples are provided herein, one related to maximizing the response rate and the other related to maximizing the expected net benefit. For the examples, TSATracker-1, TSATracker-2 and Product refer to known data sets. TSATracker-1 and TSATracker-2 data sets are collected data sets from asking questions to strangers in social media about wait times for security checks at an airport. The Product data set refers to questions asked to strangers in social media regarding a product where 1540 people were asked to respond, and 474 responses were received (i.e., 31% response rate). Additionally, for each person where data was collected from, additional most recent tweets (i.e., up to 200) were collected.

Maximizing Response Rate.

In this set of examples, it is demonstrated how an example optimization-based approach may be used to maximize/optimize the response rate. For each example data set, five-fold cross-validation tests are performed. In the examples, "asking at least K % of people" is used as a constraint to search for the optimal interval that maximizes the response rate. Varied K (e.g., K=5%, 10%, etc.) are used and observed how different optimal sizes are calculated in each case. For all such cases, uniform weights are assumed, where B−C=C=1.

Figure 5:
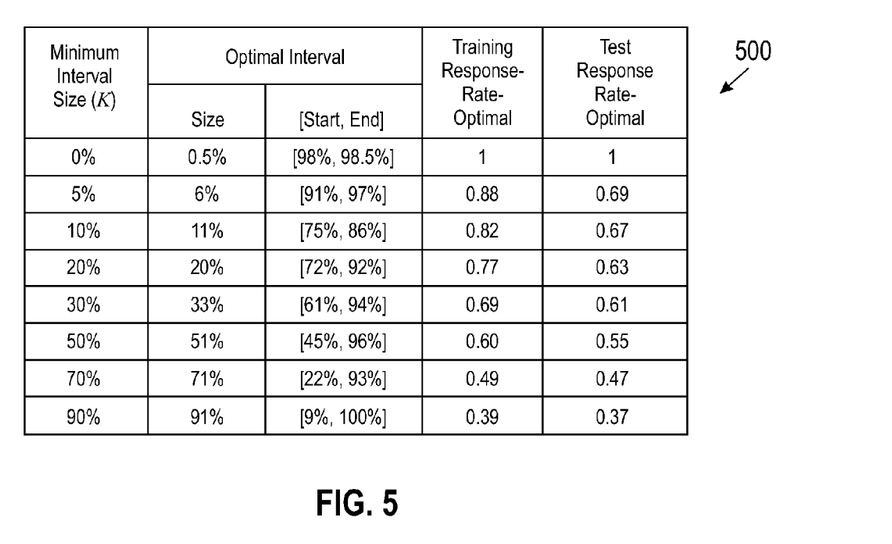
FIG. 5 illustrates a table showing example variations of optimal interval, training and test set response-rate with increasing minimum size of the interval, in accordance with an embodiment of the invention.
Figure 7:
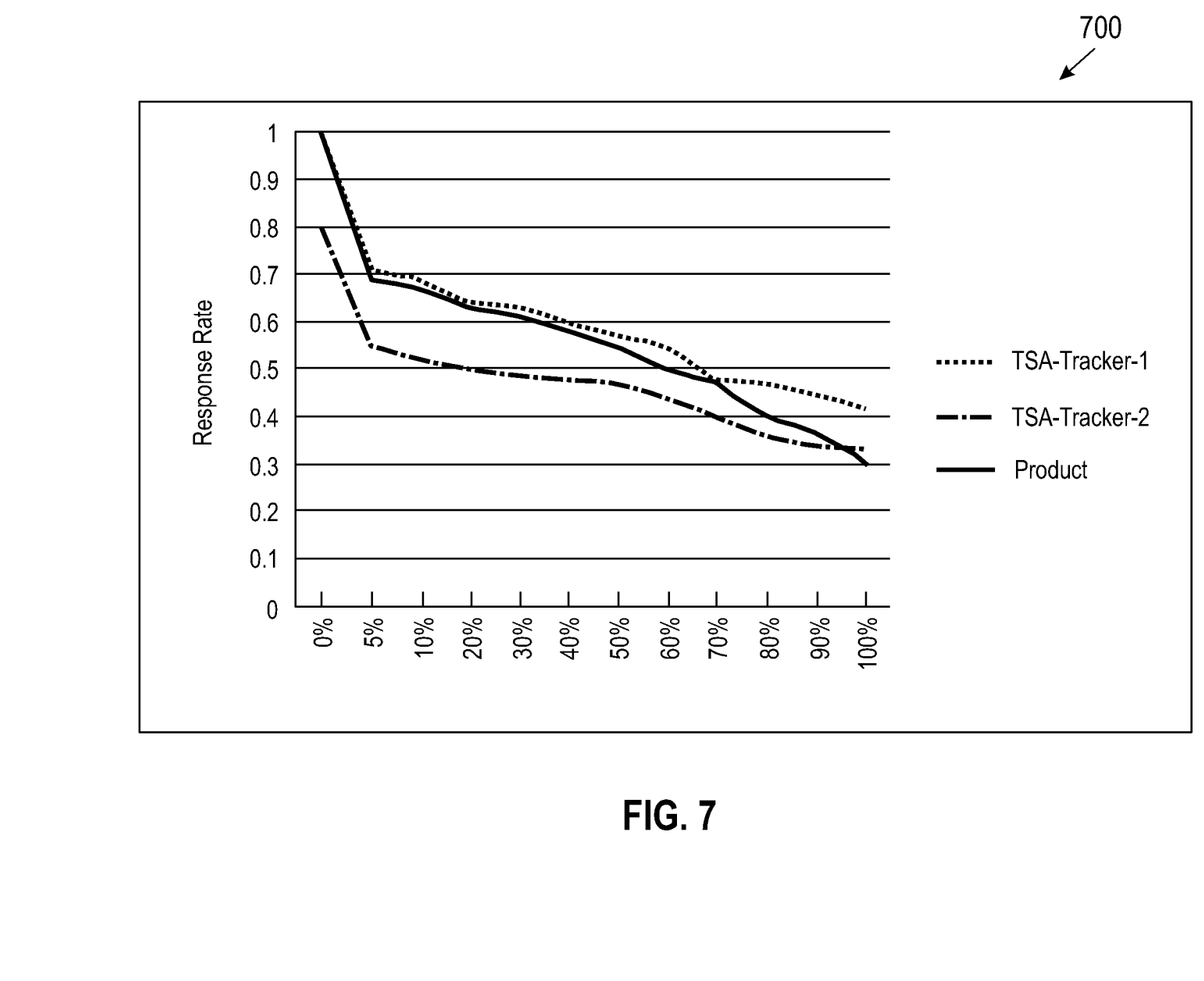
FIG. 7 illustrates an example response-rate variation on test set against a changing minimum percentage to ask using a SVM model, in accordance with an embodiment of the invention.
Figure 8:
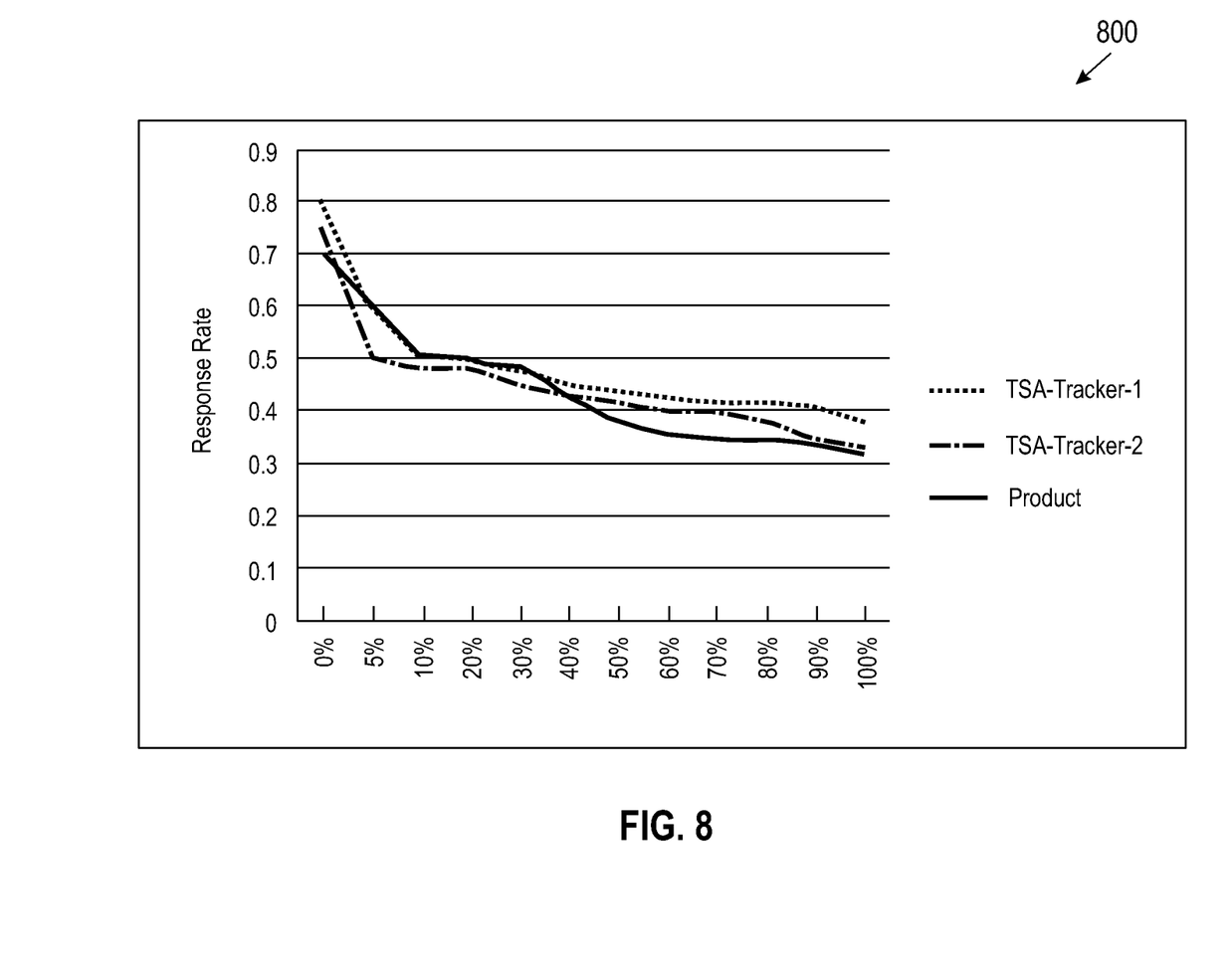
FIG. 8 illustrates an example response-rate variation on test set against a changing minimum percentage to ask using a regression model, in accordance with an embodiment of the invention.

The expected maximum response rate is defined to be the response rate computed for the optimal interval in the training set. The response rate is then computed on the test set for the same optimal interval and compared with the expected maximum response rate. FIG. 5 shows example results in table 500 for the Product data set using a SVM-based model. As expected, the expected maximum response rate obtained from the training set is higher than the response rate on the test set. FIG. 7 shows an example graph 700 with the response-rate variation on a test set with changing minimum percentage to ask using an SVM model, while FIG. 8 shows graph 800 based on using a regression-based model for the variation of the response rate in the test set for our data sets with varied K, and the minimum number of people (in percentages) to ask. We see that response rate drops with increasing minimum number of users to ask. Response rates obtained using an SVM-based model shown in FIG. 7 were better than the logistic-regression-based model shown in FIG. 8.

Regardless which model is used (i.e., SVM or regression-based), on average, the examples shown improved the response rate across all data sets when compared with a baseline (42% for TSATracker-1, 33% for TSATracker-2 and 31% for Product). On average, when an SVM-based model is used, 60% response rates were obtained for a TSA-tracker-1 data set, a 47% response rate was obtained for a TSA-tracker-2 data set, and a 57% response rate was obtained for the Product data set. Using a logistic-regression-based model, the corresponding response rates obtained were 48%, 45% and 44%.

Figure 6:
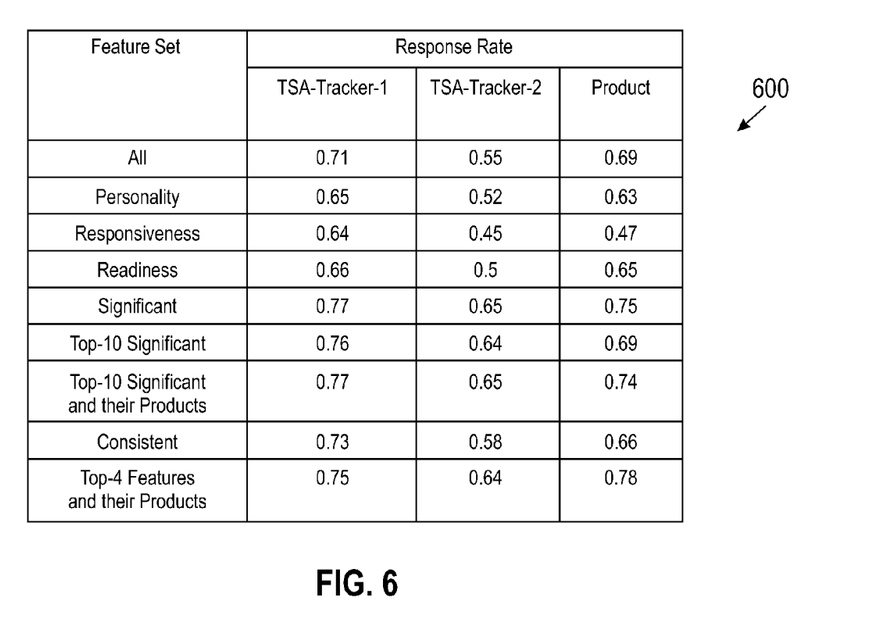
FIG. 6 illustrates a table showing response rates using different feature selection, in accordance with an embodiment of the invention.

In the examples, a number of feature sets are used: personality features alone, responsiveness features alone, readiness features alone, statistically significant features, top-10 statistically significant features, top-10 statistical significant features and additional features from products of each pair, consistent features and hand-selected top-four features (e.g., communication, response rate, tweeting inactivity, and tweeting likelihood of the day) and their products from each pair. The hand-picked top four features were discovered from an extensive set of tests. It should be noted that the four hand-picked features are orthogonal to each other: communication is a personality feature, response rate is a social behavioral feature, and the other two are readiness features. FIG. 6 shows response rates in table 600 for the models obtained using different feature sets when the minimum percentage to ask was set at 5%.

We see a drop of performance when personality, responsiveness, or readiness features were used alone. The set of statistically significant features improved the response rates. However, the difference in response rates is quite small when top-ten statistically significant features were used versus all statistically significant features were used. Use of additional features by taking products of each pair of features slightly improved the response rate. The set of consistent features also resulted in small improvements. It is notable that the best response rate for the Product data set was obtained using the top-four hand-picked features. This feature combination also performed reasonably well for the other data sets.

Figure 9:
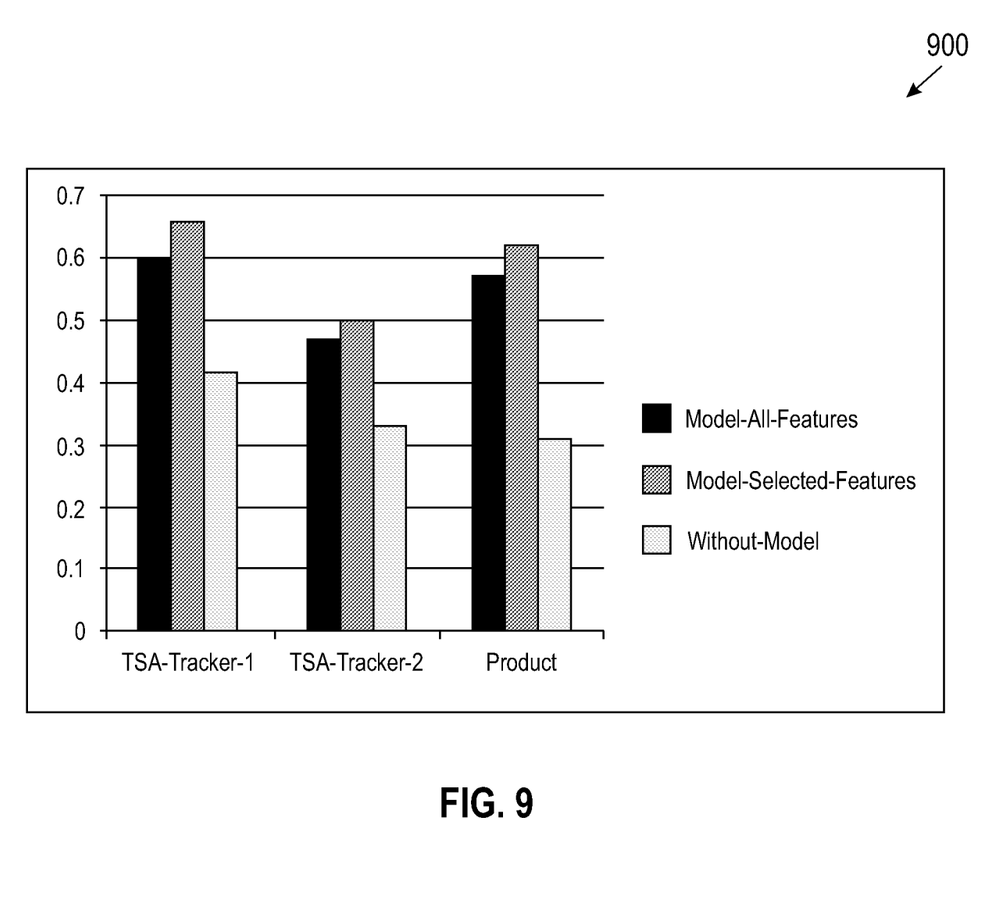
FIG. 9 illustrates an example chart showing improvement of average response rate using response modeling and optimization (SVM model), in accordance with an embodiment of the invention.

To understand the overall effect, FIG. 9 shows a bar graph 900 illustrating the comparative performance between the example approach and the baseline. Using statistically significant features, on average, one example produced a 67% response rate for TSA-tracker-1, 50% response rate for TSA-tracker-2, and a 62% response rate for the Product data set. These results present large improvements over the original response rates at 42%, 33%, and 31%, respectively.

To illustrate maximizing net benefit, TSA-tracker and Product data sets are used with five-fold cross validation. In one example, the user selection optimization module 105 computed an optimal interval from the training set that maximized the net benefit. This optimal interval also defined the corresponding interval in the test set, which selected the subset of people to be asked. A comparison of the net benefit with the expected net benefit—what would have been obtained from the data set if the user selection optimization module 105 was not used is performed. The expected net benefit is determined as follows: Let r denote the response rate of the data set, and let M denote the total number of people in the test set. If the benefit is B per answer and the cost is C per question (assuming unit benefit and cost), then (without user selection optimization module 105) the expected net benefit per question is equal to r·B−C. If the latter is not positive, then it is best not to send any question. Otherwise, it is best to send questions to everybody in the test set, in which case the expected net benefit is equal to M·(r·B−C). If the user selection optimization module 105 is used, the expected response rate depends on the selected subset of the test set. If the selected subset contains S individuals and its response rate is denoted by s, then the expected net benefit from asking only those S individuals is equal to S·(s·B—C).

Figure 10:
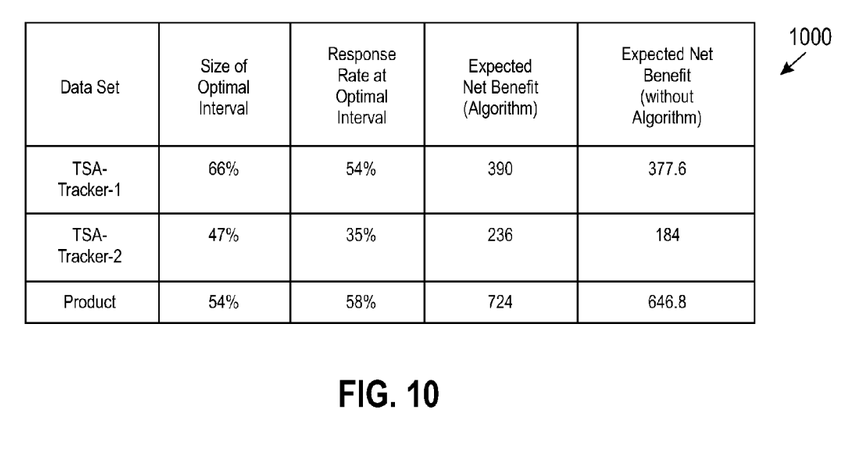
FIG. 10 illustrates a table showing an example size of optimal interval, in accordance with an embodiment of the invention.
Figure 11:
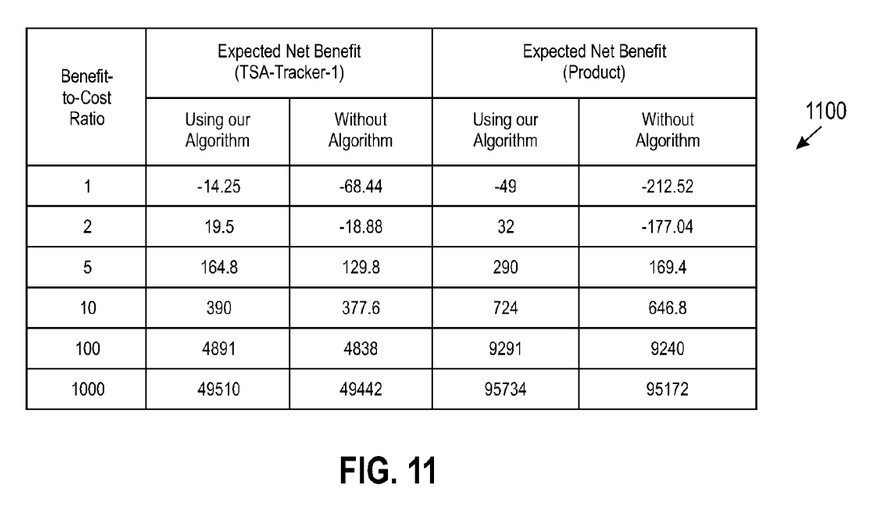
FIG. 11 illustrates a table showing an example of expected net benefits for different ratios of benefit and cost, in accordance with an embodiment of the invention.

FIG. 10 shows a table 1000 where the size of the selected interval, the response rate at the selected interval, the expected net benefit for the interval using user selection optimization module 105, and the expected net benefit without using user selection optimization module 105 for all data sets, when it is assumed B=10 and C=1. In each case, an SVM-based model was used. It is readily seen that for all data sets, the expected net benefit obtained using user selection optimization module 105 outperformed the expected net benefit without using the user selection optimization module 105. In one example, it is examined how the expected net benefits change when the ratio of benefit and cost changes. Specifically, different benefit to cost ratio are used and observed how expected net benefits change. FIG. 11 shows the result for TSA-tracker-1 and Product data sets in table 1100. In each of these cases, the expected net benefit obtained using user selection optimization module 105 outperformed the benefit without using t h e user selection optimization module 105.

In one example, domain sensitivity is tested using the user selection optimization module 105. In this example, a SVM-based model using statistically significant features from TSA-Tracker-1 data set is used. The model is applied to the Product data set and vice versa. The minimum interval size in this example is set at 5%. To make the size of training and test set uniform, a subset of 500 users is selected randomly from each data set. A 68% response rate for TSA-Tracker-1 data set and 61% response rate for Product data set is obtained in this example. This shows that models provided by the user selection optimization module 105 are fairly domain insensitive and may be applied across domains.

In one example, the system 100 automatically sent a question to a random person on Twitter® at a fixed time interval (e.g., every 5 minutes). In one example, questions in three general areas are used: weather, public safety, and education. Sample questions may include: "@needy Doing a research about your local public safety. Would you be willing to answer a related question?" "@john Doing a survey about your local school system. Would you be willing to answer a related question?" "@dolly Collecting local weather data for a research. Would you tell us what your local weather was last week?" In this example, these questions were sent to random people on Twitter® without considering their willingness, ability, or readiness to answer these questions. Therefore, this example provides a true baseline to understand the usefulness of using the user selection optimization module 105.

In one example, three different new Twitter® accounts were created and these accounts were used to send 250 questions to other users for each of the three general areas, respectively. In this example, however, all three accounts were temporarily suspended after sending a certain number of questions to other users. Table 1 shows the number of questions sent in each area before the corresponding account was suspended.

TABLE 1

|  | No. of Questions | No. of Responses |
|---|---|---|
| Weather | 187 | 7 |
| Public Safety | 178 | 6 |
| Education | 101 | 3 |

Table 1 shows that very low response rates resulted (well below 5% in each area). This implies that it is ineffective to ask random strangers on social media without considering their willingness, ability, or readiness to answer questions. Moreover, the account suspension also suggests that many people who received the questions may have flagged the accounts as a spamming accounts.

It should be noted that while the examples described used Twitter®, the system 100 may be used with other social media platforms as well as different classes of information collection applications.

Figure 12:
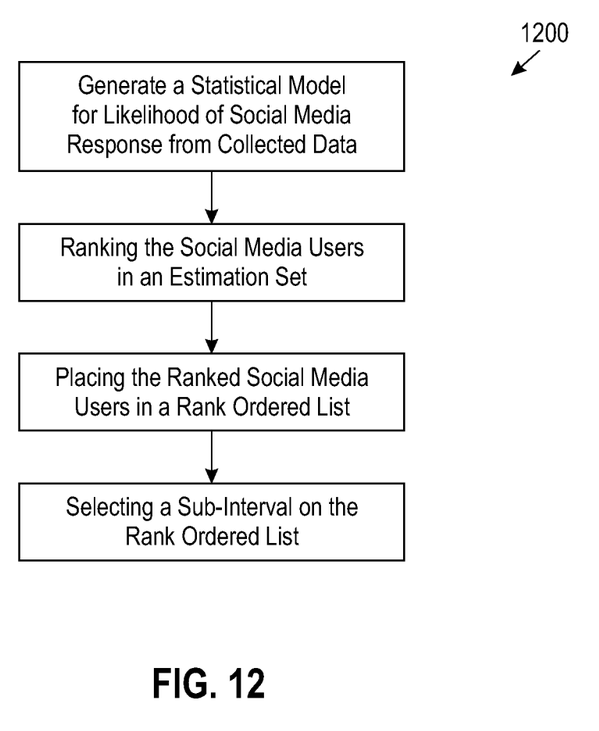
FIG. 12 is a block diagram showing a process for optimizing user selection for task performance in social media, in accordance with an embodiment of the invention.

FIG. 12 illustrates a flowchart of an example process 1200 for optimizing user selection in social media for task performance according to one embodiment. In process block 1210, a statistical model is generated for the likelihood of social media response from collected data, for example, by the modeling module 120 in FIG. 1. In process block 1220, social media users are ranked in an estimation set, for example, by the ranking module 130 of system 100. In process block 1230, the ranked social media users are placed in a rank ordered list by, for example, the ranking module 130 of system 100. In process block 1240, a sub-interval is selected from the rank ordered list, for example, by the sub-interval selection module 140 of system 100. In one embodiment, process 1200 may further include using linear projection of the selected sub-interval for user selection, for example, by the linear projection module 150.

Figure 13:
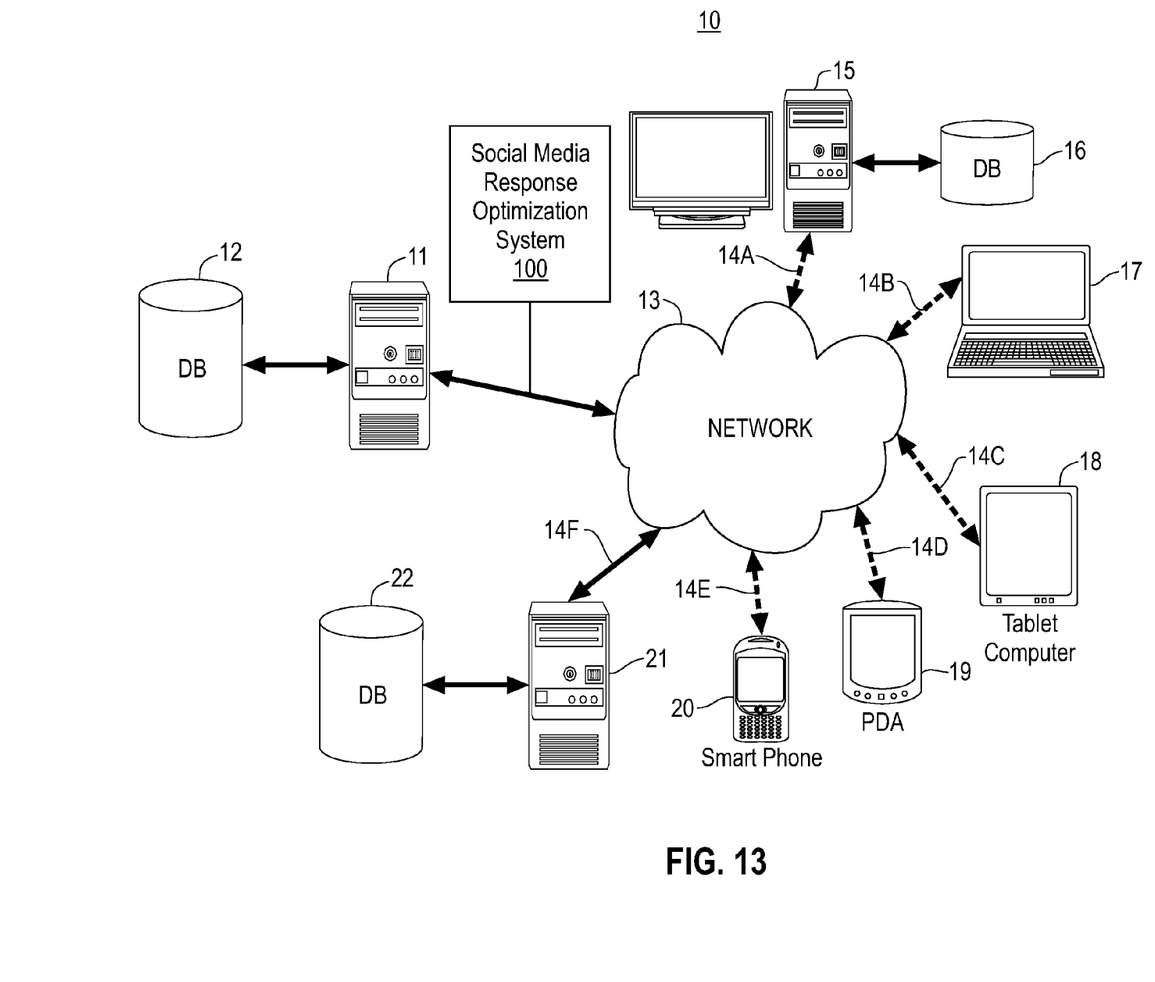
FIG. 13 is a block diagram illustrating an example of a network environment for optimizing user selection for task performance in social media, according to an embodiment of the present invention.

FIG. 13 illustrates an example of the basic components of an information technology system 10 utilizing system 100, according to an embodiment of the present invention. The information technology system 10 includes a server 11 and remote devices 15 and 17-20 that may utilize the system 100 of the present invention. In one embodiment, the server 11 implements the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data, the remote devices 15 and 17-20 can access the third party computer systems 21 and database 22 directly using the network 13.

Figure 14:
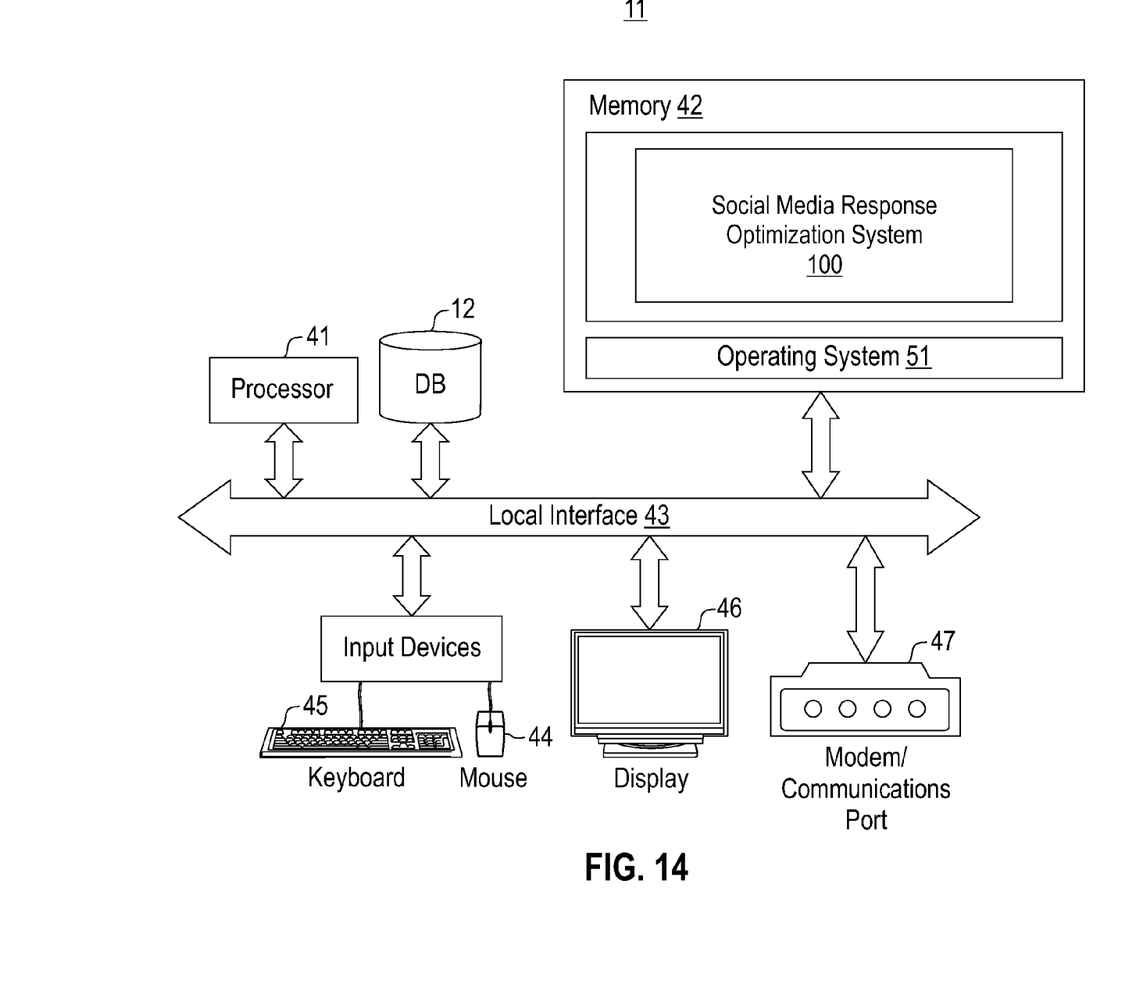
FIG. 14 is a block diagram illustrating an example of a server including a system utilizing optimization of user selection for task performance in social media, according to an embodiment of the present invention, as shown in FIG. 4.

The system 100 utilizes a process for optimizing user selection for task performance in social media, according to an embodiment of the invention. Illustrated in FIG. 14 is a block diagram demonstrating an example of server 11, as shown in FIG. 13, utilizing the system 100 according to an embodiment of the present invention. The server 11 includes, but is not limited to, PCs, workstations, laptops, PDAs, palm devices, and the like. The processing components of the third party computer systems are similar to that of the description for the server 11 (FIG. 14).

Generally, in terms of hardware architecture, as shown in FIG. 14, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 14, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, starts the O/S 51, and supports the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

When the system 100 is implemented in software, as is shown in FIG. 14, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to, an Internet browser. The information accessed in server 11 and database 12 can be provided in a number of different forms including, but not limited to, ASCII data, WEB page data (i.e., HTML), XML or other type of formatted data.

As illustrated, the remote device 15 and 17-20 are similar to the description of the components for server 11 described with regard to FIG. 5. The remote devices 15 and 17-20 are referred to as remote devices 15 for the sake of brevity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
   generating a statistical model for modeling a likelihood of social media user response from data collected from social media using a set of available features;
   ranking the social media users in an estimation set based on the statistical model;
   placing the ranked social media users in a rank ordered list;
   selecting a sub-interval on the rank ordered list for maximizing the response rate; and
   determining a unit benefit per user response and a unit cost per requested response.

2. The method of claim 1, further comprising:
   using linear projection of the selected sub-interval for user selection of one or more targeted requests for responses.

3. The method of claim 1, wherein selecting the sub-interval is based on particular constraints.

4. The method of claim 3, wherein the particular constraints comprise one of a predetermined minimum number of user requests for responses, and a predetermined maximum number of user requests for responses.

5. The method of claim 1, wherein the collected data comprises answer response data from posted questions.

6. The method of claim 1, wherein the statistical model is used to rank social media users that are strangers to one another in an estimation set in the order of response probability.

7. The method of claim 6, wherein actual response information is available for the estimation set.

8. A method comprising:
- generating a statistical model for modeling a likelihood of social media user response from data collected from social media using a set of available features;
- ranking the social media users in an estimation set based on the statistical model;
- placing the ranked social media users in a rank ordered list;
- selecting a sub-interval on the rank ordered list for maximizing an expected net benefit for user selection of one or more targeted requests for responses; and
- determining a unit benefit per user response and a unit cost per requested response.

9. The method of claim 8, wherein expected net benefit comprises a difference between a total benefit for improving user response rate and a total cost for improving the user response rate.

10. The method of claim 8, wherein selecting the sub-interval is based on particular constraints.

11. The method of claim 10, wherein the particular constraints comprise one of a predetermined minimum number of user requests for responses, and a predetermined maximum number of user requests for responses.

12. The method of claim 8, wherein the collected data comprises answer response data from posted questions.

13. The method of claim 8, wherein the statistical model is used to rank social media users that are strangers to one another in an estimation set in the order of response probability.

14. The method of claim 13, wherein actual response information is available for the estimation set.

15. The method of claim 8, further comprising:
- using linear projection of the selected sub-interval for user selection of one or more targeted requests for responses, wherein cost per requested response and benefit per user response are determined based on one or more of a linear function and a non-linear function.

16. A computer program product for optimizing user selection for response to requests, the computer program product comprising a computer readable storage medium having program code embodied therewith, the program code readable/executable by a processor to perform a method comprising:
- generating a statistical model, by the processor, for modeling a likelihood of social media user response from data collected from social media using a set of available features;
- ranking the social media users in an estimation set, by the processor, based on the statistical model;
- placing the ranked social media users, by the processor, in a rank ordered list;
- selecting a sub-interval on the ranked list based on preselected response related criteria; and
- determining, by the processor, a unit benefit per user response and a unit cost per requested response.

17. The computer program product of claim 16, where the criteria comprises one of maximizing the response rate of one or more targeted requests for user responses, and maximizing an expected net benefit for user selection of one or more targeted requests for responses.

18. The computer program product of claim 17, further comprising:
- using linear projection of the selected sub-interval, by the processor, for user selection of one or more targeted requests for responses, wherein selecting the sub-interval is based on particular constraints comprising one of a predetermined minimum number of user requests for responses, and a predetermined maximum number of user requests for responses.

19. The computer program product of claim 18,
- wherein the collected data comprises answer response data from posted questions, and the statistical model is used to rank social media users that are strangers to one another in an estimation set in the order of response probability,
- wherein actual response information is available for the estimation set, and
- wherein the expected net benefit comprises a difference between a total benefit for improving user response rate and a total cost for improving the user response rate.

20. The computer program product of claim 19,
- wherein cost per requested response and benefit per user response are determined based on one or more of a linear function and a non-linear function.

* * * * *